July 1, 1941.  G. C. PAPENDICK  2,247,696
MEANS FOR FRACTIONATING SLICED BREAD LOAVES
Filed March 10, 1939   4 Sheets-Sheet 1
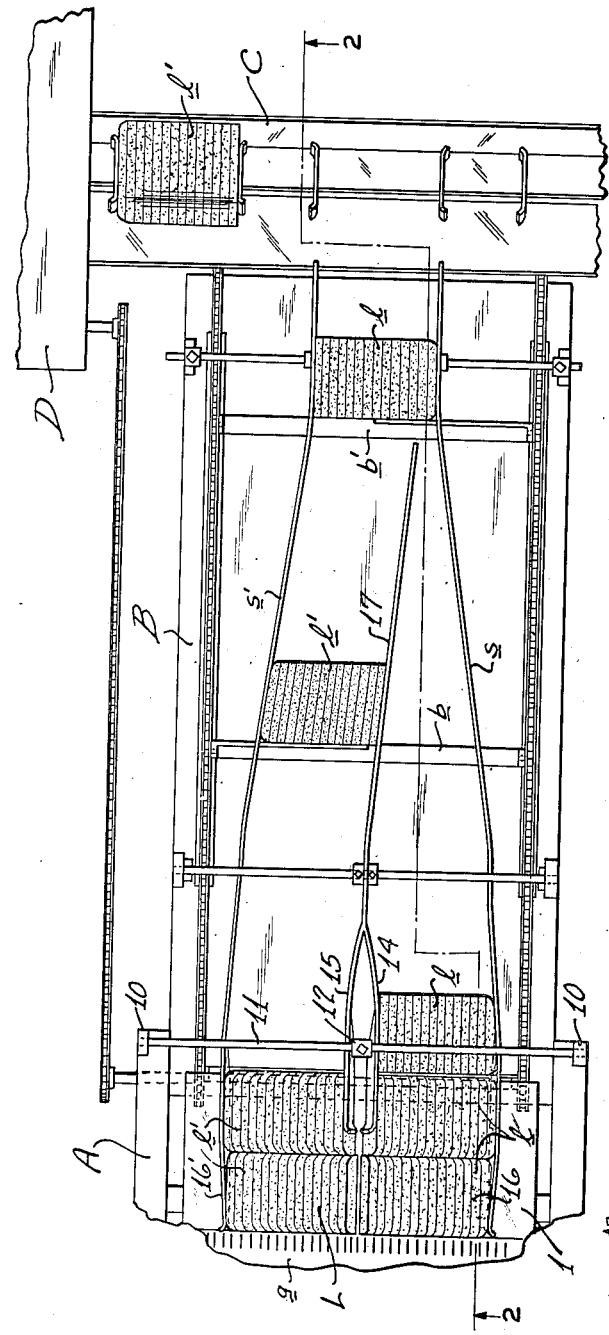
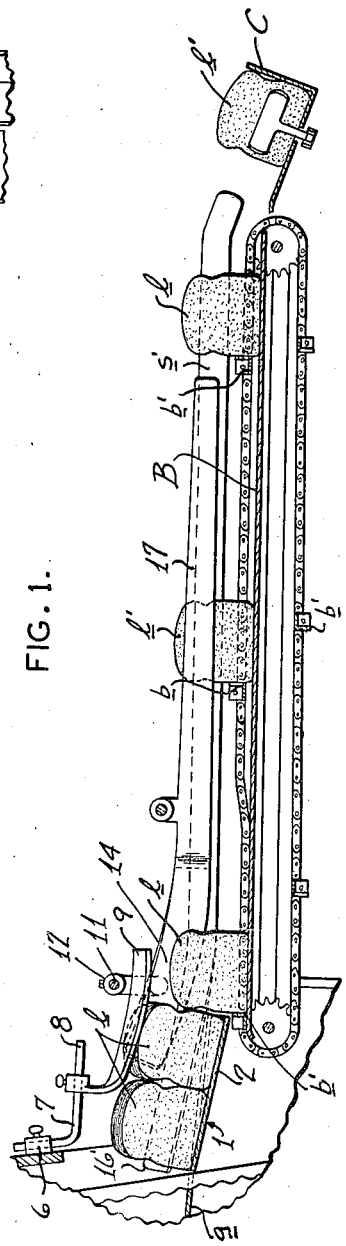
INVENTOR
GUSTAV C. PAPENDICK
ATTORNEY July 1, 1941.  G. C. PAPENDICK  2,247,696

MEANS FOR FRACTIONATING SLICED BREAD LOAVES

Filed March 10, 1939  4 Sheets-Sheet 2

INVENTOR
GUSTAV C. PAPENDICK
BY
ATTORNEY

INVENTOR
GUSTAV C. PAPENDICK
BY
ATTORNEY

July 1, 1941.　　　G. C. PAPENDICK　　　2,247,696
MEANS FOR FRACTIONATING SLICED BREAD LOAVES
Filed March 10, 1939　　　4 Sheets-Sheet 4
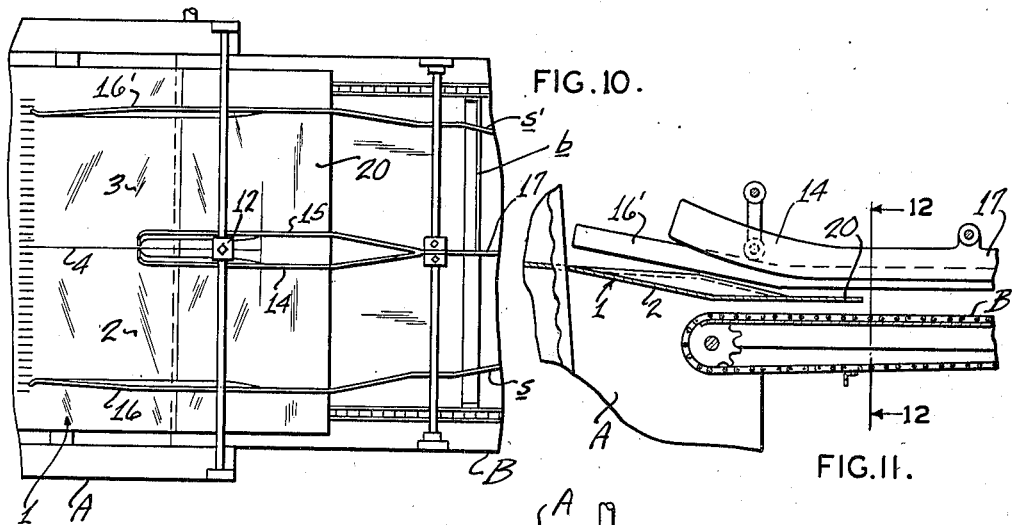
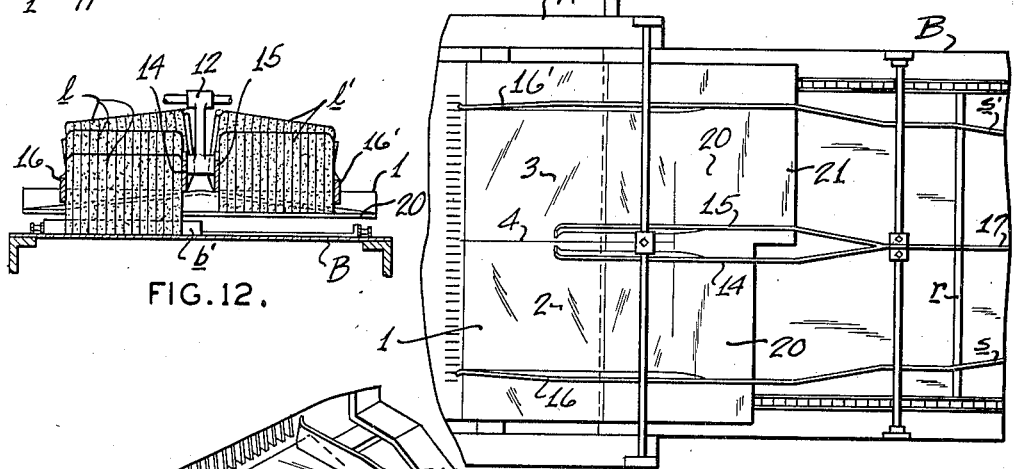
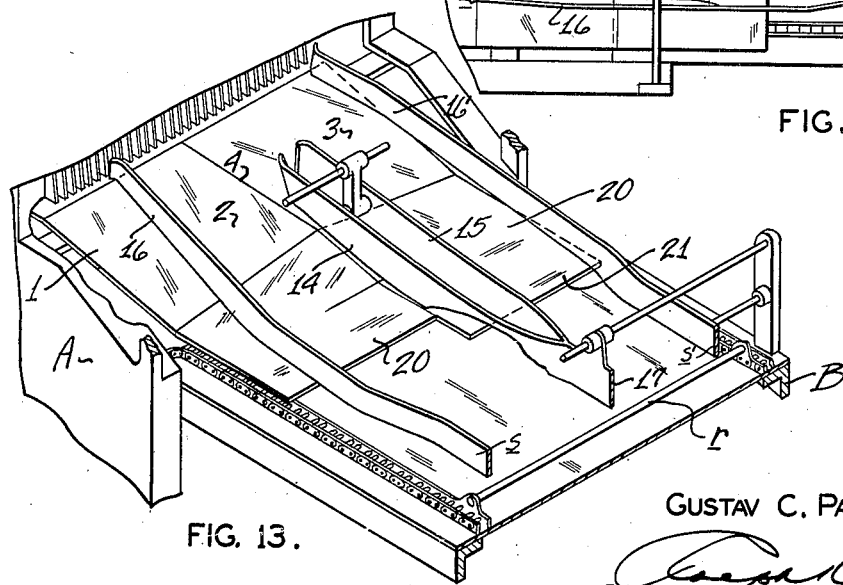
INVENTOR
GUSTAV C. PAPENDICK
ATTORNEY

UNITED STATES PATENT OFFICE 2,247,696

MEANS FOR FRACTIONATING SLICED BREAD LOAVES

Gustav C. Papendick, University City, Mo.; Elizabeth Papendick executrix of Gustav C. Papendick, deceased, assignor to Papendick, Inc., St. Louis, Mo., a corporation of Missouri Application March 10, 1939, Serial No. 260,904

23 Claims. (Cl. 146—153)

This invention has to do with a certain new and useful improvement in methods and means for fractionating sliced bread-loaves and is related to the subjects-matter of my co-pending applications Serial Nos. 242,430, 242,431, 242,432, 242,433, and 242,434, all filed November 25, 1938.

My present invention has for its primary objects the provision not only of a relatively simple method, but also of means for automatically and efficiently subdividing successive sliced bread-loaves into a plurality of fractions economically and without materially increasing production cost of the loaves and at high speed in times relation to the other loaf production processes.

And with the above and other objects in view, my invention resides both in the unique method-steps and in the novel features of form, construction, arrangement, and combination of parts presently described and pointed out in the claims.

In the accompanying drawings (4 sheets)—

Figure 1 is a top plan view of a sliced bread loaf fractionating machine constructed in accordance with and embodying my present invention;

Figure 2 is a longitudinal sectional view of the machine, taken approximately along the line 2—2, Figure 1;

Figure 4:
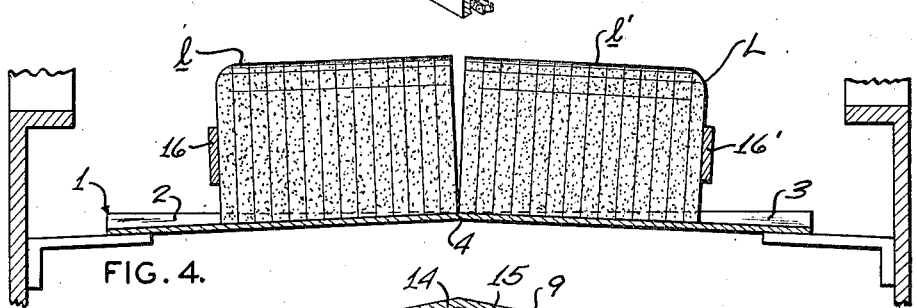
Figure 5:
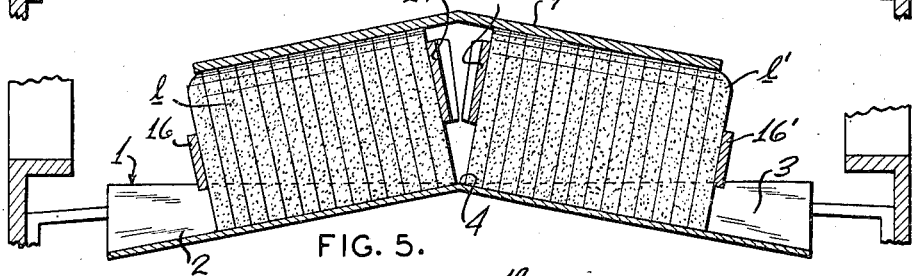
Figure 6:
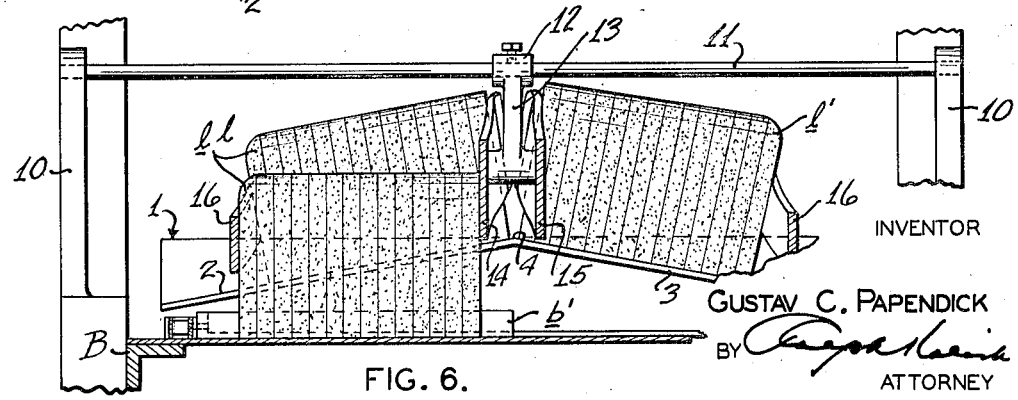
Figure 7:
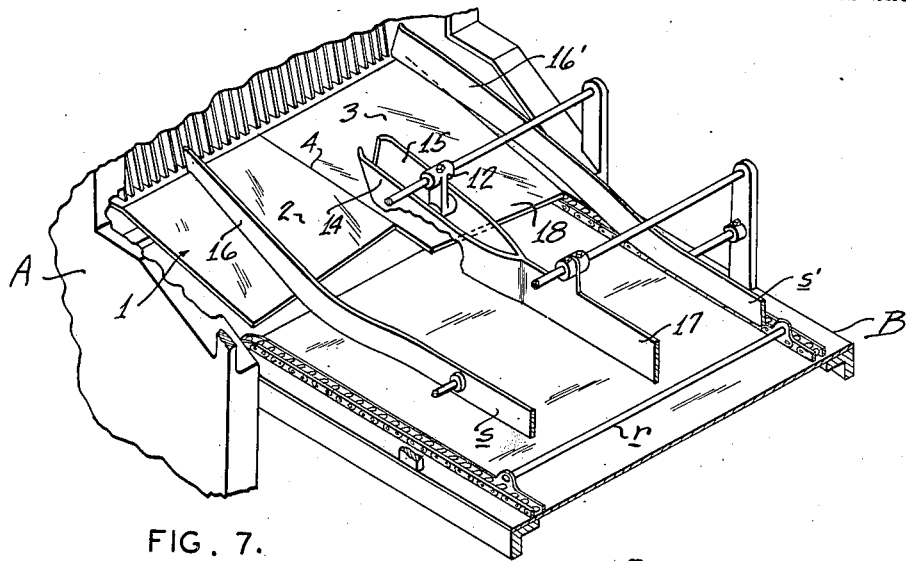
Figure 8:
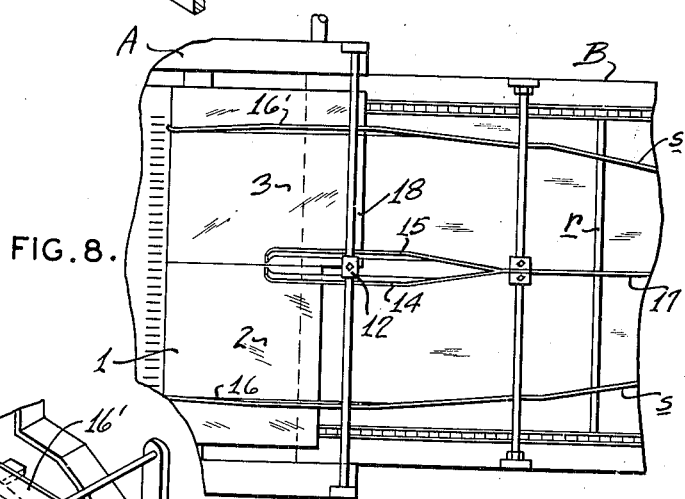
Figure 9:
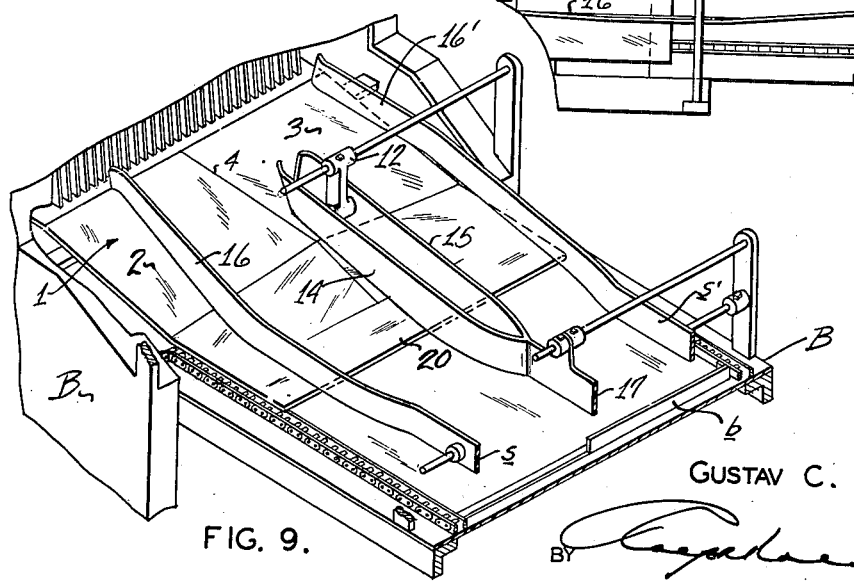

Figures 4, 5, and 6 are transverse sectional views of the loaf-dividing means of the machine, illustrating the loaf-dividing operations thereof;

Figure 7 is a fragmentary perspective view of the machine equipped with a first modified form of loaf-dividing means of my invention;

Figure 8 is a top plan view of the modified machine of Figure 7;

Figure 9 is a fragmentary perspective view of the machine equipped with a second modified form of loaf-dividing means of my invention;

Figure 10 is a fragmentary top plan view of the machine of Figure 9;

Figure 11 is a fragmentary longitudinal sectional view of the machine of Figure 9;

Figure 12 is a transverse sectional view, taken approximately along the line 12—12, Figure 11;

Figure 13 is a fragmentary perspective view of the machine equipped with a third modified form of loaf-dividing means of my invention; and Figure 14 is a fragmentary top plan view of the modified machine of Figure 13.

Referring now in more detail and by reference characters to the drawings, which illustrate practical embodiments of my invention, A designates a loaf-slicing machine preferably of the vertically reciprocable knife type, forming part of which on its discharge side is a transfer conveyor B preferably of the chain-driven flight type comprising a plurality of sets of cross-bars $b$, $b'$, and transversely adjustable obliquely bent side guides $s$, $s'$, all as more fully and particularly disclosed and described in my said co-pending application Serial No. 242,430.

At the discharge end of the transfer conveyor B, is a wrapping machine conveyor C preferably of the conventional moving pocket type adapted to receive and progress the fractionated bread-loaves intermittently for stepwise movement into the wrapping machine D, all as best seen in Figure 1 and for purposes presently more fully appearing.

At its discharge end, the slicing machine A is provided with a transversely extending fractionating plate 1, which is divided longitudinally into two loaf-supporting slides 2, 3, extending obliquely downwardly away from each other with an increasing slope both forwardly away from the discharge end of the slicing machine A and laterally toward the side margins of the transfer conveyor B, thereby forming with each other and with the slicing machine grid plate $g$ lines of intersection 4, 5, which are substantially in the same plane, as best seen in Figures 3, 4, 5, and 6.

Adjustably mounted in a sleeve 6 formed on the frame of machine A is an L-shaped bracket rod 7 having a forwardly extending horizontally disposed leg 8 for shiftably supporting a hold-down plate 9 extending transversely over, and bent or curved to conform in shape to the underlying portions of, the loaf-dividing or fractionating plate 1, as best seen in Figures 2 and 5.

Mounted at its ends in, and extending horizontally between a pair of, arms 10 upstanding from opposite sides of the conveyor B, is a cross rod 11 for shiftably supporting a sleeve 12 provided with a downwardly depending hanger arm 13.

Figure 3:
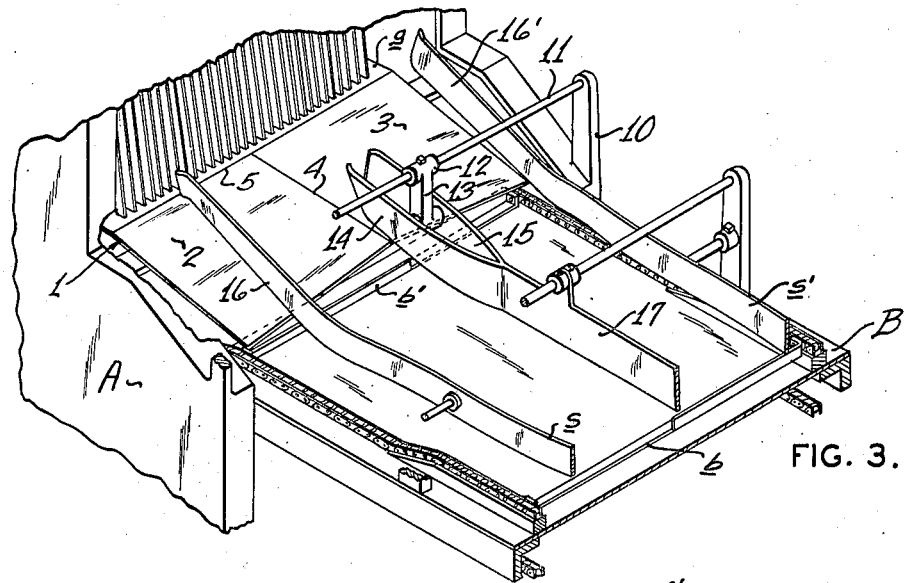
Figure 3 is a fragmentary perspective view of the loaf-dividing means of the machine.

Fixed on the opposed lateral faces of the hanger arm 13, is a pair of curved divider guides 14, 15, positioned equidistantly on either side of the ridge 4 adjacent the rearward extremity thereof and being so bent or shaped as to be substantially at right angles at all points to the loaf slides 2, 3, respectively. Similarly the side guides $s$, $s'$, at their rearward or receiving ends 16, 16', are bent into substantially parallel uniformly spaced conformation with the guides 14, 15, respectively, which latter longitudinally extend forwardly over the transfer conveyor B. As shown and as best seen in Figure 3, the guides 14, 15, are shaped to converge and merge at their forward extremity into a single continuing intermediate guide 17, which extends forwardly over the conveyor B and is substantially flexible throughout its length in the provision of a loaf-shifting or switching member co-operating with the flights b, b', as best seen in Figures 1 and 3 and in substantially the manner previously disclosed and described in my said co-pending application No. 242,430.

Each sliced loaf L, as it is progressed through the slicing machine A, will issue and travel onto the divider plate 1, the ridge 4 of which is positioned to coincide with any selected slice cut across which the particular loaf is to be divided or fractionated. Thus, as a loaf L moves forwardly across the plate 1, the portions thereof on either side of the selected slice cut will conform to the angles of inclination or slope of the slides 2, 3, and the loaf will accordingly be broken open or divided in more or less bookwise fashion about the ridge 4 into two separate fractions l, l', the respective slices thereof being prevented from falling over by the deformed side guide portions 16, 16'. As the loaf fractions l, l', progress further across the divider plate 1, the angle or bend between them will be increased, thus increasing the space between the inwardly presented or opposed faces of the fractions l, l'. At such point, the inner faces of the loaf fractions l, l', begin to move across the forwardly presented ends of the divider guides 14, 15, and beneath the bent hold-down plate 9, all as best seen in Figure 5.

Ultimately the divided fractions l, l', will drop over the rearward margin of the divider plate 1 upon the transfer conveyor B and will be individually progressed thereacross to the wrapping machine conveyor C by the flights b, b', as best seen in Figures 1 and 6 and as more fully disclosed and described in my previously mentioned co-pending application Serial No. 242,430.

In the event it is desirable that the transfer conveyor B be provided with conventional flight rods r, I have found that it will be convenient to provide the divider plate 1 with a preferably integrally formed step flange 18 extending forwardly for a width substantially equivalent to one-third the width of the loaf and having a length equal to the width of the loaf slide 3, all as best seen in Figures 7 and 8, and functioning substantially in the same manner and employing the same principles as the plate step flange more fully disclosed and described in my previously mentioned co-pending application Serial No. 242,430.

It will, of course, be apparent in the previously described embodiments of my present invention that the bread loaf fractions l, l', are oblique to the surface of the transfer conveyor B as they drop from the divider plate 1 onto the transfer conveyor B. If, on the other hand, it becomes desirable that the loaf fractions l, l', be returned to horizontal position before deposition upon the transfer conveyor B, then the divider plate 1 may be provided along its forward margins with a preferably integral extension 20, which is curved inwardly toward its center portion in the formation of continuation portions of the slides 2, 3, having a progressively modified angularity returning to a uniform horizontal plane along its forward portion, all as best seen in Figures 9, 10, and 11.

As the bread loaf fractions l, l', move across the forward extension 20, they are returned to axially aligned horizontal position, but are maintained in axially spaced relationship, all as best seen in Figure 12.

As previously pointed out, it may be desirable under certain circumstances to employ a transfer conveyor having conventional flight rods r, in which case I may also provide the extension 20 with a forwardly extending step-plate or flange 21 extending across one-half the width thereof for the purpose of consecutively separating the respective fractions l, l', substantially in the manner disclosed and described in my previously mentioned co-pending application Serial No. 242,430.

It will be evident that, by my present invention, I have provided unique means of subdividing or fractionating sliced bread-loaves, which is not only simple, economical, and convenient, but may be readily applied to various different types of existing bread slicing and conveying machinery without necessitating any material or extensive reconstructions or adaptations of such machinery. In addition, I have found that my present machine will subdivide sliced bread-loaves without damaging any of the loaf slices and does not require any particular or critical adjustment with reference to the specific slice cut about which the loaf is to be subdivided.

It should be understood that changes and modifications in the form, construction, arrangement, and combination of the several parts of the machine and in the described method of loaf fractionating may be made and substituted for those herein shown and described without departing from the nature and principle of my invention.

Having thus described my invention, what I claim and desire to secure by Letters Patent is:

1. A baked loaf slicing and fractionating mechanism comprising slicing means, a conveyor, guide means operatively mounted on the conveyor for defining separate pathways, and means operatively interposed between the slicing means and the conveyor for parting the sliced loaf into a plurality of fractions, said means including tilting means for displacing a portion of said loaf by lowering an end of such portion with respect to its other end and means for moving the parted fractions respectively along the defined pathways.

2. A baked loaf slicing and fractionating mechanism comprising slicing means, a conveyor, guide means operatively mounted on the conveyor for defining separate pathways, means operatively interposed between the slicing means and the conveyor for parting the sliced loaf into a plurality of fractions, said means including tilting means for displacing a portion of said loaf by lowering an end of such portion with respect to its other end, means for moving the parted fractions respectively along the defined pathways, and means for directing the two parted fractions into said pathways.

3. A baked loaf slicing and fractionating mechanism comprising slicing means, a conveyor, guide means operatively mounted on the conveyor for defining separate pathways, means operatively interposed between the slicing means and the conveyor for parting the sliced loaf into a plurality of fractions, said means including tilting means for displacing a portion of said loaf posed in substantial alignment with a slice-cut and downward inclination forwardly along its outer longitudinal margins for displacing selected groups of bread slices angularly downwardly with respect to each other for subdividing the loaf into two fractions, said plate further having at its discharge end a rearwardly extending reversely bent portion terminating in a plane surface across its entire transverse margin for returning the bread slices of the respective fractions to upright position.

14. A baked loaf fractionating mechanism comprising a bent plate for slidably supporting the loaves and having two fixed surfaces angularly disposed with respect to each other in the provision of an upwardly presented loaf-parting ridge disposed in substantial alignement with a slice-cut for angularly displacing selected groups of bread slices with respect to each other for subdividing the loaf into fractions, said plate being provided along its discharge margin with a forwardly extending step flange extending across one-half the length of said forward margin for further displacing the groups of slices with respect to each other.

15. A baked loaf slicing and fractionating mechanism comprising slicing means, conveying means, and a stationary plate operatively interposed between the slicing means and conveying means, said plate having a straight line edge adjacent the slicing means and two obliquely disposed sections intersecting in the plane of the edge for breaking the sliced loaf apart along a slice-cut into a plurality of fractions as the loaf is progressed across the plate.

16. A baked loaf slicing and fractionating mechanism comprising slicing means, conveying means, a stationary plate operatively interposed between the slicing means and conveying means, said plate having an initial flat section adjacent the slicing means merging into an intermediate section including two obliquely disposed sections intersecting in the plane of the flat section in the provision of an edge for parting the sliced loaf along a slice-cut into a plurality of fractions as the loaf is progressed across the plate, and a hold-down plate operatively mounted above the stationary plate and provided with oblique sections parallel to and spaced upwardly from the oblique sections of the stationary plate for holding the fractions down upon the stationary plate.

17. A baked loaf slicing and fractionating mechanism comprising slicing means, conveying means, a stationary plate operatively interposed between the slicing means and conveying means, said plate having an initial flat section adjacent the slicing means merging into an intermediate section including two obliquely disposed sections intersecting in the plane of the flat section in the provision of an edge for parting the sliced loaf along a slice-cut into a plurality of fractions as the loaf is progressed across the plate, and intermediate guide means positioned adjacent the oblique sections of the stationary plate for engagement with the opposite end faces of the loaf fractions as the fractions are progressed from the stationary plate to the conveying means.

18. A baked loaf slicing and fractionating mechanism comprising slicing means, conveying means, and a stationary plate operatively interposed between the slicing means and conveying means, said plate having two spaced parallel flat sections and an intermediate section consisting of oppositely curved surfaces intersecting in the provision of a loaf-parting edge extending between the flat sections and disposed in substantial alignment with a slice-cut for initially bending the sliced loaf along a slice-cut in the formation of a plurality of loaf fractions as the loaf is progressed thereacross and then subsequently tilting the fractions back into axial alignment as the fractions continue to progress across the intermediate section and move onto the adjacent section.

19. In a baked loaf fractionating mechanism, a conveyor table having a loaf-separating section divided transversely into two flat sections disposed obliquely to each other and intersecting in the formation of a longitudinally extending ridge and at their forward and rearward margins merging into common planes.

20. In a baked loaf fractionating mechanism, a conveyor table for slidably supporting the loaves and having an interrupted surface composed of a plurality of sections angularly displaced with respect to each other and each intersecting with an adjacent section in the provision of a loaf-parting ridge disposed in substantial alignment with a slice-cut for dividing a sliced loaf into a plurality of fractions during the course of its movement across such interrupted table-section.

21. A sliced bread loaf fractionating machine comprising a delivery plate for receiving the sliced loaf with the slices uprightly disposed, a conveyor, and means operatively interposed between said plate and conveyor, said means including surfaces oblique with respect to each other in the provision of a line of intersection substantially coincident with a selected slice-cut for angularly upsetting a selected portion of the loaf slices about a horizontal line substantially at right angles to the longitudinal axis of the loaf for subdividing the loaf into a plurality of fractions.

22. A sliced bread loaf fractionating machine comprising a delivery plate for receiving the sliced loaf with the slices uprightly disposed, a conveyor, and means operatively interposed between said plate and conveyor, said means including surfaces oblique with respect to each other in the provision of a line of intersection substantially coincident with a selected slice-cut for upsetting a selected portion of the loaf slices about a horizontal line substantially at right angle to the longitudinal axis of the loaf for subdividing the loaf into a plurality of fractions and discharging said fractions upon the conveyor in axially spaced relation.

23. A sliced bread loaf fractionating machine comprising a flat plate for receiving the sliced loaf with the slices uprightly disposed, a conveyor, means operatively interposed between said plate and the conveyor, said means including surfaces oblique with respect to each other in the provision of a line of intersection substantially coincident with a selected slice-cut for upsetting a selected portion of the loaf slices about a horizontal line substantially at right angle to the longitudinal axis of the loaf for subdividing the loaf into a plurality of fractions and discharging said fractions upon the conveyor in axially spaced relationship, and means for confining the fractions to separate paths of movement across the conveyor.

GUSTAV C. PAPENDICK.